W. A. SCHMIDT AND G. C. ROBERTS.
APPARATUS FOR SEPARATING SUSPENDED PARTICLES FROM GASES.
APPLICATION FILED MAR. 23, 1914.
1,343,482.
Patented June 15, 1920.
2 SHEETS—SHEET 2.
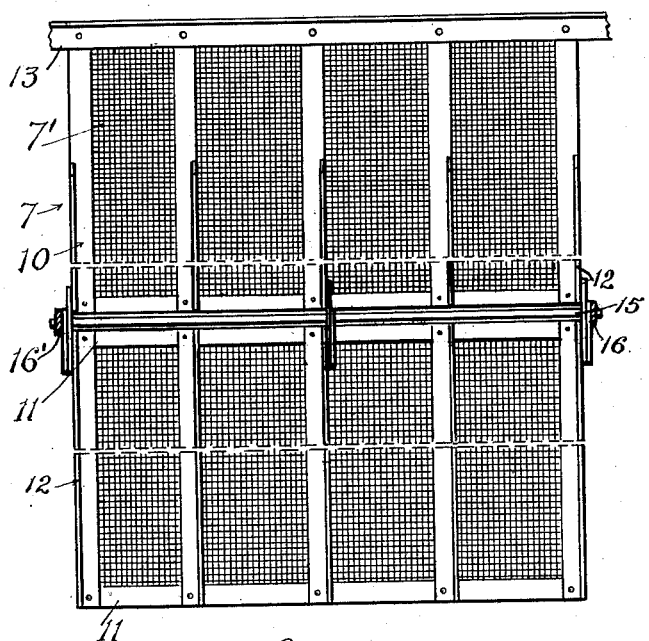
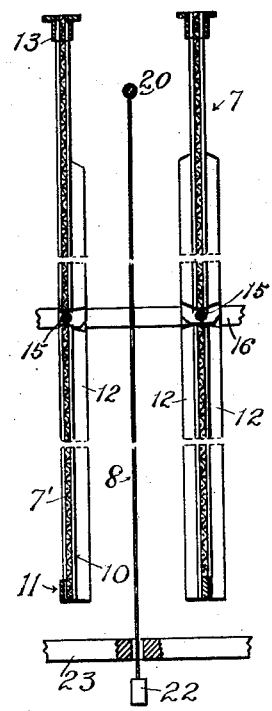
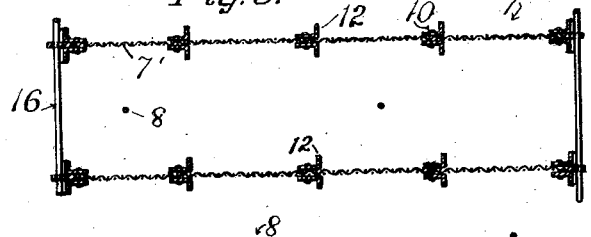
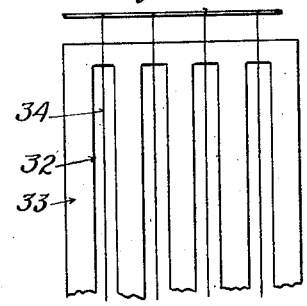
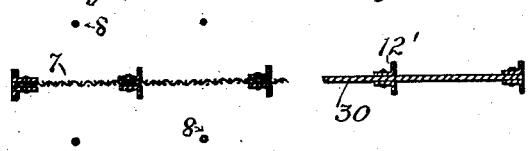
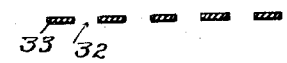
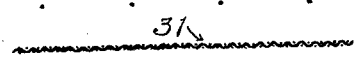
Inventors:
Walter August Schmidt
George Clifford Roberts
by Arthur P. Knight
Atty
Witnesses:
Wm. N. Drew
H. M. Mosher

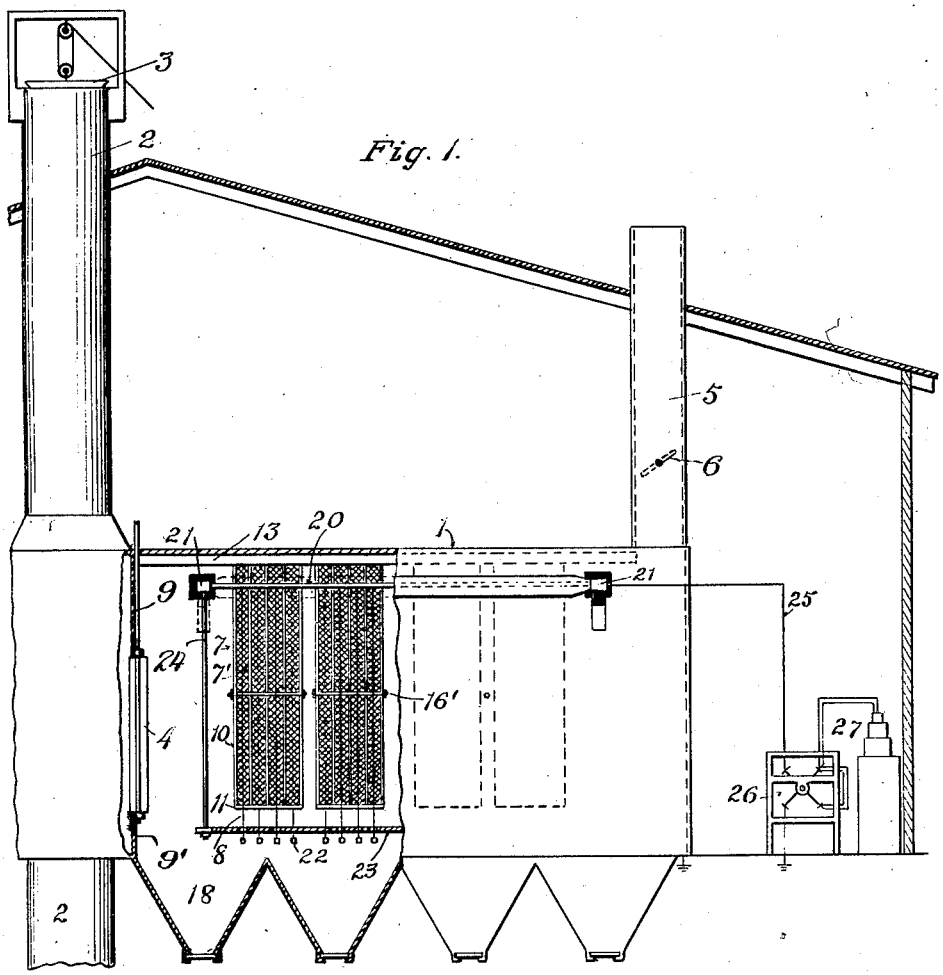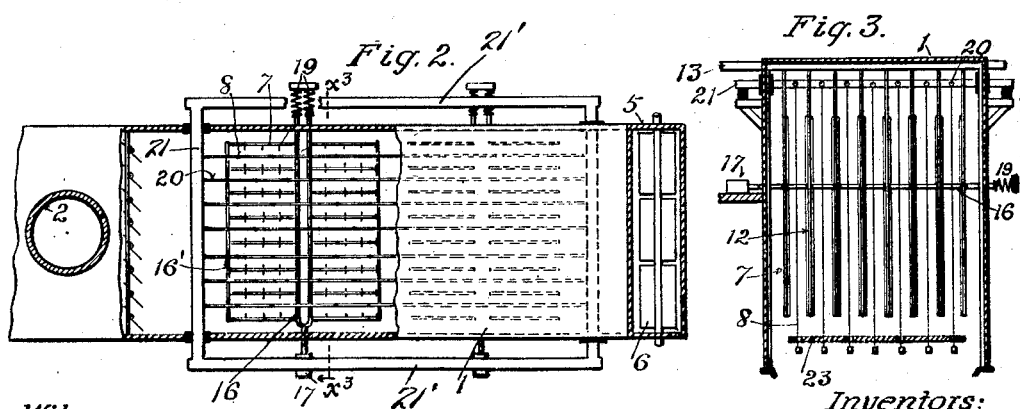

UNITED STATES PATENT OFFICE.

WALTER AUGUST SCHMIDT AND GEORGE CLIFFORD ROBERTS, OF LOS ANGELES, CALIFORNIA, ASSIGNORS TO INTERNATIONAL PRECIPITATION COMPANY, OF LOS ANGELES, CALIFORNIA, A CORPORATION OF CALIFORNIA.

APPARATUS FOR SEPARATING SUSPENDED PARTICLES FROM GASES.

1,343,482.          Specification of Letters Patent.    Patented June 15, 1920.

Application filed March 23, 1914. Serial No. 826,675.

*To all whom it may concern:*

Be it known that we, WALTER AUGUST SCHMIDT and GEORGE CLIFFORD ROBERTS, citizens of the United States, residing at Los Angeles, in the county of Los Angeles and State of California, have invented certain new and useful Improvements in Apparatus for Separating Suspended Particles from Gases, of which the following is a specification.

This invention relates to apparatus for separating dust, soot, or other solid or liquid particles from gases, by electrical action. It is well known that suspended particles can be removed from gases by passing said gases through an apparatus in which a silent or glow discharge is maintained between two sets of electrodes. If the field between the electrodes is unidirectional, and the electrodes are so formed as to facilitate discharge from one set of electrodes, and minimize discharge from the other set, the suspended particles can be given electric charges by the discharge from the electrodes facilitating such discharge, (here referred to as the discharge electrodes) and caused to migrate under the action of the electric field, toward the other electrodes, here referred to as the "collecting" electrodes for the reason that the particles tend to collect thereon.

We have found that it is difficult to effect a complete removal of the suspended particles from the gas, particularly when it is necessary to pass the gas through the apparatus at high velocity, as some of the particles are carried through the apparatus without reaching the collecting electrodes in their migratory movement. A number of causes may contribute to this result, one of which is the interference with migratory movement, due to reverse action at the collecting electrodes. Under the conditions above set forth, the ionization of the gas at the discharge electrodes causes the suspended particles to assume charges of the same sign as the discharge electrodes, and as these charged particles approach the collecting electrodes they are subject to more or less effect of ionization from the collecting electrodes, tending to neutralize, or even to reverse their charges, with the result that they cease to approach the collecting electrodes, or even migrate in the opposite direction, being, in either case, swept forward by the current of gas, without being given an opportunity for precipitation on the collecting electrodes, this being one of the causes of imperfect precipitation. Another cause of incomplete precipitation is the disturbing effect due to the gas eddies at the surface of the collecting electrode, set up by the so-called electrical windage.

The main object of our invention is to overcome the tendency for the particles to be swept through the apparatus without precipitation. For this purpose we so construct the electrodes as to reduce to a minimum the "back ionization" from the collecting electrodes; we provide baffles on the collecting electrodes which arrest or retard the motion of the particles along these electrodes; and we form the collecting electrodes in such manner as to permit passage of gas through the same, thereby minimizing the disturbing effects due to obstruction of the electrical windage.

A further object of the invention is to provide an installation for the above stated purpose, of minimum weight and cost for a given capacity.

The accompanying drawings illustrate embodiments of our invention, and referring thereto:

Figure 1 is an elevation, partly in section, of a treater constructed according to our invention, for precipitating the dust in the flues of cement kilns, or for similar purposes.

Fig. 2 is a partly sectional plan view of such treater.

Fig. 3 is a section on line $x^3-x^3$ in Fig. 2.

Fig. 4 is a side elevation of one of the collecting electrodes.

Fig. 5 is a vertical section of the electrodes.

Fig. 6 is a horizontal section of the electrodes.

Figs. 7, 8 and 9 are partial horizontal sections, showing modified constructions of the electrodes.

Fig. 10 is a side elevation and Fig. 11 a horizontal section of another modification of the electrodes.

Referring to Figs. 1 to 3, the treater or apparatus is shown as comprising a suitable casing or chamber 1, connected to receive the gases and suspended particles from a stack or flue 2, suitable valves or dampers 3 and 4 being provided for directing the gases through the chamber 1 as required. The chamber 1 is provided with an outlet stack 5, having a damper 6 which enables general control of the draft through the apparatus and also enables the pressure within the apparatus to be controlled to some extent. A wall portion 9 extending down from the top of chamber 1, serves as obstructing means which serves to overcome any tendency of the gas to flow preponderantly at the top of the chamber, and another wall or obstructing means 9' extending up from the bottom of the chamber serves to prevent or minimize the passage of gas below the electrode mounted in the chamber. These obstruction means 9 and 9' serve as means for control of the vertical distribution of the gases in such manner as to bring the gas in effective contact with the electrodes. The damper means 4 consisting for example of separate dampers distributed within the inlet opening for chamber 1 provide for control of the horizontal distribution of the gas, and as shown, these dampers may be independently adjustable, so as to provide for independent control at different parts of the chamber.

Within the chamber 1 are provided sets of collecting electrodes 7, preferably suspended from a supporting frame 13, so as to extend in rows, parallel to one another and to the direction of the flow of gas through the treater. These electrodes preferably consist of wire screen or equivalent perforate material 7' held in metal frames which may be formed of angle iron uprights 10, united by cross-bars 11. The flanges 12 of these angle irons project into the spaces between the electrodes, so as to constitute baffles for the gas flowing past the electrodes.

Bars 16 and 16' connect all the electrodes 7 of each set, said bars constituting spacing means whereby said electrodes are held in rigidly spaced relation, and a pneumatic hammer 17 is provided for operation on bars 16, to jar the suspended system of electrodes, and loosen the precipitate therefrom, suitable bins or discharge means 18 being provided at the bottom of chamber 1 to receive such precipitate.

A buffer spring 19 is provided for each jarring bar 16, to hold the electrodes 7, normally in proper position. The electrodes 7 may be made in sections, hinged together by bars 15, to permit them to hang to true vertical position.

Discharge electrodes 8 are provided, opposite the respective collecting electrodes, said discharge electrodes consisting of wires hung from suspension rods 20, supported on an insulated frame comprising transverse members 21 and longitudinal members 21'. The flanges or baffles 12 on the collecting electrodes extend vertically and are spaced apart so as to form recesses between them and the discharge electrodes are preferably hung opposite these recesses, that is, intermediate the baffles. The wires 8 may be provided with tensioning weights 22 and retained in position by an insulated grid 23, at their lower portions. Said grid 23 is rigidly connected, as shown in Fig. 1 to the upper frame members 21, by vertical members 24. The longitudinal members 21' of the upper frame serve as thrust members holding the transverse members 21 in rigid relation and sustaining the longitudinal strain offered by the suspension rods 20. We prefer to arrange these electrodes 8 so that the electrodes 8 at one side of any perforate collecting electrode 7, are offset with reference to the electrodes 8 at the other side of said electrode 7, so that the windage from each electrode 8 passes through the electrode 7 unopposed by the windage from another electrode 8, and the disturbing effects of eddies at the electrode 7 are thereby avoided. If desired, however, the electrodes 8 on opposite sides of electrodes 7 may be arranged in opposition as shown in Fig. 7.

Suitable means are provided for maintaining a unidirectional difference of potential between the electrodes 7 and 8. For this purpose the discharge electrodes 8 are connected, through the supporting frame 21 and wire 25, with a rectifier 26, which rectifies the alternating current from a step-up transformer 27, connected to receive current from any suitable source. The collecting electrodes 7 may be grounded, through the supporting frame 13, ground connections being made at the rectifier to complete the circuit.

The operation is as follows: The gas from the flue or stack 2 is caused to pass through the treater chamber 1, and the electrodes 8 and 7 are maintained at a suitable unidirectional potential difference, for example, about 30,000 volts, with the result that ionization of the gas is produced at the discharge electrodes, causing the suspended particles to become charged similarly to such electrodes, and to migrate toward the electrodes 7 under the action of the electrostatic field between the electrodes 8 and 7. As the particles migrate in this manner toward the electrodes 7 they are swept forward by the current of gas through the treater, but as they approach the electrodes 7, this forward motion of the particles with the gas, is arrested or retarded by the flanges 12, so that the particles are given full opportunity to become precipitated on the electrodes 7. The flanges 12 extending transversely to the current of gas, serve not only as baffles to retard the motion of the gas and provide dead air spaces in which the particles may migrate with a minimum of "creeping" action, but they also serve to give the effect of concavity to the collecting electrodes, the ionizing electrodes being opposite the recessed or set-back portions between these flanges, and being parallel to the flanges, so that the intensity of the electric field at these portions is reduced, with corresponding reduction in the "back-ionization" from the collecting electrodes, together with minimizing of the objectionable results of such back-ionization, above set forth. These flanges or projecting portions of the collecting electrodes, also serve to provide alternate expansions and contractions of the flue spaces between the electrodes, which enables more effective distribution. Any windage or convection of the gas due to the electric field or discharge, is unobstructed by the screen electrodes 7, the gas passing freely through the screen, so that there is no rebound or eddying of the gas at the surface of the electrodes 7, and the suspended particles are deposited on these electrodes without disturbance.

We have found that the precipitate so formed on the collecting electrodes is in some cases quite adherent, but in most cases it can be dislodged and removed by strong jarring or vibration of the electrodes. For this purpose the pneumatic devices 17 are operated to strike the bars 16 and thereby jar all the electrodes 7, in such manner as to loosen the precipitated matter, and cause it to fall into the discharge means 18.

The screen electrodes above described establish practically the same electrical field conditions as would be obtained with a solid plane-surfaced electrode but have the advantage that they permit free passage of the gas through the meshes of the screen. Moreover, the wire screen has less weight per given area than a solid electrode, and its use reduces the weight and cost of the treating apparatus. When an electrode of this character is used, the electric wind does not rebound from the surface thereof, as it becomes impossible to establish a gas-compression zone at the surface of the electrode, and the suspended particles can be forced over to the surfaces of the collecting electrodes and precipitated thereon, without meeting a reverse current of gases. This is particularly true when the ionizing electrodes are offset as in Fig. 6, so that the windage from each electrode is unopposed by that from other electrodes. By the use of such screen electrodes, precipitation is therefore made more efficient, and the gas to be cleaned can be passed through the apparatus at a greater velocity.

With the construction shown in the drawing and above described, there is a tendency at each interruption at the rectifier 26 for oscillations to be set up in the circuit of the electrical precipitating apparatus and discharge electrodes connected to the high tension side of the rectifier then acting as electrodes from which electromagnetic waves, due to such oscillations, are propagated into the gas stream approaching the electrodes. The fact that the connection of the high tension circuit is made to the end of the high tension discharge electrode system farthest removed from the inlet of the gases to the precipitating apparatus conduces to this effect and is of advantage in enabling the discharge electrode system to produce electromagnetic waves and resulting agitation field within the stream flow path in advance of the ionization field, the suspended particles being first subjected to an agitating field due to the propagation of these electromagnetic waves in the advancing gases and then subjected to an ionization field maintained between the discharge and collecting electrodes.

While the several features of our invention, above described, coöperate to a single end, namely the complete precipitation of the suspended particles before they are carried through the apparatus by the current of gas, some of these features may be used without the others. For example, as illustrated in Fig. 8 the baffle flanges 12′ may be provided on collecting plates 30, which are imperforate, or, as shown in Fig. 9 the collecting plates 31 may be perforate, but without flanges.

Instead of forming the collecting plates as screens, we may, as shown in Figs. 10 and 11, provide for passage of gas through them by forming slots 32 in the collecting plates or electrodes 33, the ionizing electrodes 34 being opposite and parallel to these slots.

What we claim is:

1. In an apparatus for separating suspended particles from gases, a chamber provided with gas inlet and outlet means, for passing a current of gas through said chamber, a collecting electrode presenting relatively extended surface adapted to minimize discharge and extending in said chamber parallel to the direction of motion of said current of gas, said collecting electrode having perforations distributed throughout its surface, and a discharge electrode in said chamber opposite said collecting electrode and presenting relatively small surface of a form adapted to facilitate discharge.

2. In an apparatus for separating suspended particles from gases, a collecting electrode consisting of a perforated screen, a discharge electrode opposite said collecting electrode and formed to facilitate electrical discharge therefrom, and a chamber inclosing said electrodes and provided with means for directing a current of gas between said electrodes in a direction parallel to the surface of the collecting electrode.

3. An apparatus for separating suspended particles from gases, comprising collecting electrodes consisting of screens extending in parallel planes, discharge electrodes interposed between the collecting electrodes and a chamber inclosing said electrodes and provided with means for passing a current of gas between said electrodes, in a direction parallel to the surface of said collecting electrodes.

4. In an apparatus for separation of suspended particles from gases, a collecting electrode extending in a vertical plane and means for passing a current of gas in a horizontal direction, parallel to the plane of said electrode having a substantially plane surface, said collecting electrode being provided with vertical flanges secured thereto acting as baffles.

5. An apparatus for separation of suspended particles from gases, comprising a collecting electrode having a substantially plane surface provided with flanges secured thereto and projecting from said substantially plane surface, and means for passing a current of gas parallel to said collecting electrode and transversely to said flanges.

6. An apparatus for separating suspended particles from gases, comprising collecting electrodes arranged in parallel planes, means for passing a current of gas between said electrodes, baffle flanges on said electrodes, extending transversely to the path of the current of gas, and discharge electrodes extending parallel to said flanges, and arranged between the collecting electrodes.

7. In an electrical precipitator, a collecting electrode, a discharge electrode opposite the collecting electrode, means for directing a current of gas between said electrodes and parallel to the surface of the collecting electrode, and a plurality of vertical baffles extending from the collecting electrode and transversely to the direction of the flow path of the current of the gas to prevent shifting of the precipitated material along the electrode in the direction of the gas flow.

8. In an electrical precipitator, a collecting electrode formed as a screen and vertical baffles extending therefrom transversely to the flow of gas to prevent shifting of the precipitated material along the electrode in the direction of the gas flow.

9. An apparatus for separating suspended particles from gases, comprising a collecting electrode having a relatively extended substantially plane surface and having perforations distributed throughout its surface, discharge electrodes having surfaces of relatively limited area and formed so as to facilitate discharge therefrom arranged on opposite sides of said collecting electrode, and a chamber inclosing said electrodes and provided with means for directing a current of gas between the collecting electrode and the discharge electrodes, in a direction parallel to the surface of the collecting electrode.

10. An apparatus for separating suspended particles from gases, comprising a perforated collecting electrode, and a series of discharge electrodes arranged on each side of said collecting electrode, the discharge electrodes on one side being offset with relation to those on the other side.

11. In an apparatus for separating suspended particles from gases, a plurality of collecting electrodes formed as vertical perforated screens extending in parallel planes, a plurality of discharge electrodes formed as wires extending between the collecting electrodes, and means for passing a current of gas to be treated horizontally between the collecting electrodes.

12. In an apparatus for separating suspended particles from gases, a collecting electrode formed as a perforated screen extending in a vertical plane, and a plurality of discharge electrodes extending parallel to said collecting electrodes.

13. In an apparatus for separating suspended particles from gases, a collecting electrode formed as a perforated screen extending in a vertical plane, and provided with vertically extending flanges projecting therefrom, and a plurality of vertically extending discharge electrodes arranged opposite the portions of said screen between said flanges.

14. An electrode for electrical precipitation apparatus, comprising frames formed of vertical and horizontal bars, and wire screen material secured to and extending over the space between said bars.

15. An electrode for electrical precipitation apparatus, comprising a wire screen and bars secured to said screen and having flanges extending outwardly from the screen.

16. In an apparatus for electrical separation of suspended particles from gases, a chamber, means for directing a current of gas through said chamber, collecting electrodes formed as screens extending parallel to the direction of motion of gas through said chamber, and provided with flanges extending outwardly, from the screens and transversely to the current of gas, and discharge electrodes, extending parallel to the collecting electrodes.

17. In an apparatus for electrical separation of suspended matter from gases, a support, a collecting electrode suspended from said support, so as to be free to vibrate on its support, and hammer means supported in fixed position adjacent said electrode, for jarring the electrode to dislodge the collected material therefrom.

18. In an apparatus for electrical separation of suspended particles from gases, an electrode supported so as to be free to vibrate, and stationary hammer means adapted to jar said electrode to dislodge collected material therefrom.

19. In an electrical precipitator, the combination with a support and a vertically extending collecting electrode hung from said support, of hammer means maintained adjacent to the electrode for imparting a blow to the collecting electrode to dislodge material therefrom.

20. An apparatus, as set forth in the foregoing claim, wherein the movement of said hammer means is horizontal and transverse to the collecting electrode.

21. In the art of producing electrical precipitation of particles from fluid or gaseous streams, means for producing an ionization field in the flow path of a stream, said means including an electrode system comprising a frame carrying a plurality of parallel discharge-producing elements located in the plane of the frame.

22. In the art of producing electrical precipitation of particles from fluid or gaseous streams, means for producing an ionization field in the flow path of a stream, said means including an electrode system comprising a rigid frame maintained in predetermined relation to the opposing system of the means, said frame carrying individual discharge-producing elements extending in parallelism with and in the plane of the frame.

23. In an apparatus for electrical precipitation of suspended particles from gases, a horizontally extending chamber, electrodes extending vertically therein, a supply flue in communication with one end of said chamber, outlet means at the other end of said chamber, and obstructing means extending downwardly from the top of said chamber to control the distribution of the gases in said chamber.

24. In an apparatus for electrical precipitation of suspended particles from gases, a horizontally extending chamber, electrodes extending vertically therein, a supply flue in communication with said chamber at one end thereof, outlet means at the other end of said chamber, bin means at the bottom of said chamber and spaced from said electrodes, and obstructing means extending upwardly from the bottom of the chamber to direct the gas between the said electrodes.

25. In an apparatus for electrical precipitation of suspended particles from gases, a horizontally extending chamber, a supply flue in communication with one end of said chamber, outlet means at the other end of said chamber, electrodes in said chamber, obstructing means controlling the vertical distribution of gas in said chamber, and obstruction means controlling the horizontal distribution of gas in said chamber, and comprising adjustable damper means controlling communication from the supply flue to said flue chamber.

26. In an apparatus for electrical precipitation of suspended particles from gases, a chamber, electrodes therein, inlet and outlet flue connections for said chamber and damper means distributed laterally in said connections to distribute the gas laterally of the chamber.

27. In an apparatus for electrical precipitation of suspended particles from gases, a horizontally extending chamber, electrodes extending vertically therein, inlet and outlet flue connections for said chamber and independently adjustable damper means distributed laterally in one of said connections to distribute the gas laterally of the chamber.

28. In an apparatus for electrical precipitation of suspended particles from gases, a horizontally extending chamber, electrodes extending vertically therein, a supply flue connected to one end of said chamber, and an outlet flue connected to the other end of said chamber said inlet being provided with damper means distributed laterally of the chamber, whereby the pressure in the chamber may be controlled.

29. In an apparatus for electrical precipitation of suspended particles from gases, a horizontally extending chamber, electrodes extending vertically therein, supply and outlet flues connected to opposite ends of said chamber, and a series of bins at the bottom of said chamber and closing the same.

30. In an apparatus for electrical precipitation of suspended particles from gases, a chamber having a top plate, collecting electrodes extending downwardly from said top plate, longitudinal supporting means extending below said top plate and between said collecting electrodes, and discharge electrodes extending downwardly from said supporting means.

31. In an apparatus for electrical precipitation of suspended particles from gases, a chamber, collecting electrodes extending vertically therein, supporting means extending between said collecting electrodes and below the upper ends thereof, and discharge electrodes extending downwardly from supporting means.

32. In an apparatus for electrical precipitation of suspended particles from gases, a plurality of parallel vertical electrodes, a rigid connecting means extending transversely of said electrodes and rigidly connected thereto, and means for jarring said connecting means to dislodge material from said electrodes.

33. In an apparatus for electrical precipitation of suspended particles from gases, a collecting electrode formed with a plurality of flange forming recesses and discharge electrodes arranged opposite the respective recesses.

34. In an apparatus for electrical precipitation of suspended particles from gases, parallel collecting electrodes formed with flange forming opposing recessed portions, and discharge electrodes arranged between said collecting electrodes and opposite said recessed portions.

35. In an apparatus for electrical precipitation of suspended particles from gases, a chamber provided with gas inlet and outlet means, collecting electrodes extending in said chamber in the direction of flow of gas between said inlet and outlet means and provided with projecting flanges extending transversely to the flow of gas and forming recesses between said projecting flanges, and discharge electrodes extending opposite said recesses.

36. In an apparatus for electrical precipitation of suspended particles from gases, a chamber provided with gas inlet and outlet means and having openings in its wall, discharge electrode means mounted in said chamber, an insulated frame for supporting said discharge electrode means, and comprising horizontal frame members extending through said openings in the wall of said chamber, insulating supporting means for said frame member outside of said chamber and imperforate insulating diaphragm members extending in and closing said openings, said diaphragm members being of sufficient dimensions to effectively insulate the frame members passing therethrough.

37. In an apparatus for electrical precipitation of suspended particles from gases, a high tension discharge electrode system comprising supporting frame members extending transversely in said chamber, longitudinal suspension members extending between said transverse frame members, means for holding said transverse frame members apart and discharge electrodes supported on said longitudinal suspension members.

38. In an apparatus for electrical precipitation of suspended particles from gases, a high tension discharge electrode system comprising transverse frame members, longitudinal thrust and supporting members extending between said transverse frame members, insulating supports for said frame members, suspension members extending between said transverse frame members, and discharge electrodes hung from said suspension members.

39. In an apparatus for electrical separation of suspended particles from gases, a high tension discharge electrode system comprising a rigid upper frame, a rigid lower frame, vertical frame members rigidly connecting said upper and lower frames, and discharge electrodes mounted on and extending between said upper and lower frames.

40. In an apparatus for electrical precipitation of suspended particles from gases, a collecting electrode, vertical flanges on said electrodes terminating below the upper end of said electrode, a supporting member extending parallel to said electrode intermediate the upper end of said flange and the upper end of the electrode, and discharge electrodes hung from said supporting member.

41. In the art of producing electrical precipitation of particles from fluid or gaseous streams, opposing electrode systems adapted to form an ionizing field in the path of travel of a stream, one of said systems operating as a discharge system, said discharge system having its circuit connection at the end of the system opposite the entrance to the ionization field, whereby an agitation field will be produced within the stream flow path in advance of the ionization field.

WALTER AUGUST SCHMIDT.
GEORGE CLIFFORD ROBERTS.

Witnesses:
  H. M. MOSHER,
  WM. N. DREW.